US012801447B2

(12) United States Patent
Reddy Basireddy et al.

(10) Patent No.: US 12,801,447 B2
(45) Date of Patent: Nov. 17, 2026

(54) POLICY-BASED RESOURCE AUTOMATION THROUGH DATA INPUT / OUTPUT WORKLOAD ANALYSIS AND FORECASTING

(71) Applicant: Dell Products L.P., Round Rock, TX (US)

(72) Inventors: Ranjith Reddy Basireddy, Hyderabad (IN); George Tony, Bangalore (IN); Amol Kumar, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 358 days.

(21) Appl. No.: 18/637,210

(22) Filed: Apr. 16, 2024

(65) Prior Publication Data

US 2025/0321805 A1 Oct. 16, 2025

(51) Int. Cl.
*G06F 9/46* (2006.01)
*G06F 9/50* (2006.01)

(52) U.S. Cl.
CPC ............ *G06F 9/505* (2013.01); *G06F 9/5016* (2013.01); *G06F 9/5033* (2013.01)

(58) Field of Classification Search
CPC ....... G06F 9/505; G06F 9/5016; G06F 9/5033
See application file for complete search history.

(56) References Cited

U.S. PATENT DOCUMENTS 10,412,155 B2 * 9/2019 Kumar ................ G06F 11/3447
11,853,656 B1 * 12/2023 Naamad .................. G06F 30/20
12,147,664 B2 * 11/2024 Black .................... G06F 3/0673
12,242,757 B2 3/2025 Dar et al.
12,536,040 B2 * 1/2026 Basu ..................... G06F 9/5005
(Continued)

OTHER PUBLICATIONS portal.nutanix.com, “Nutanix Cloud Clusters on AWS—Acropolis Dynamic Scheduler,” https://portal.nutanix.com/page/documents/solutions/details?targetId=TN-2028-Nutanix-Cloud-Clusters-on-AWS:tn-acropolis-dynamic-scheduler.html, Aug. 2023. 67 pages.
(Continued)

*Primary Examiner* — Diem K Cao
(74) *Attorney, Agent, or Firm* — Amin, Turocy & Watson, LLP

(57) ABSTRACT

The technology described herein is directed towards automating the determination of recommended policies to increase, decrease or modify various resource allocations and/or resource usage on storage systems, including cloud-based systems. A multistage pipeline uses different artificial intelligence/machine learning models at various stages to determine resultant policy data for different workload input/output (I/O) pattern data, load data and/or latency data. For certain I/O patterns, forecasting is used in the policy recommendation. The policies are defined and recommended for different workloads and resource usage, thus improving overall system utilization and performance. The policies can include scale up/down or scale in/out resource recommendations based on load and latency, along with cache-related and tiering recommendations based on workload type/I/O patterns, data protection scheme recommendations, compression/deduplication recommendations and decisions for read ahead data, which is forecasted.

20 Claims, 14 Drawing Sheets

(56) References Cited

U.S. PATENT DOCUMENTS

2023/0342280 A1 * 10/2023 Dar .................... G06F 11/3485

OTHER PUBLICATIONS

Devi, et al., "Time series-based workload prediction using the statistical hybrid model for the cloud environment," vol. 105, pp. 353-374, (2023), Published: Nov. 9, 2022.

Alshawabkeh, et al., "Automated Storage Tiering Using Markov Chain Correlation Based Clustering," Published in: 2012 11th International Conference on Machine Learning and Applications, Date of Conference: Dec. 12-15, 2012, DOI: 10.1109/ICMLA.2012.71. 6 pages.

Yang, et al., "GReM: Dynamic SSD resource allocation in virtualized storage systems with heterogeneous IO workloads," Published in: 2016 IEEE 35th International Performance Computing and Communications Conference (IPCCC), Date of Conference: Dec. 9-11, 2016, DOI: 10.1109/PCCC2016.7820658. 8 pages.

Oe, et al., "Analysis of Storage Workloads of Input-Output Access Locality and Designing of Hybrid Storage System," Published in: 2016 5th IIAI International Congress on Advanced Applied Informatics (IIAI-AAI), Date of Conference: Jul. 10-14, 2016, DOI: 10.1109/IIAI-AAI.2016.54. 4 pages.

Wang, et al., "Layered Contention Mitigation for Cloud Storage," Published in: 2022 IEEE 15th International Conference on Cloud Computing (CLOUD), Date of Conference: Jul. 10-16, 2022, DOI: 10.1109/CLOUD55607.2022.00036. 12 pages.

Sfakianakis, et al., "Skynet: Performance-driven Resource Management for Dynamic Workloads," Conference: 2021 IEEE 14th International Conference on Cloud Computing (CLOUD), Sep. 2021, DOI:10.1109/CLOUD53861.2021.00069. 14 pages.

* cited by examiner

POLICY-BASED RESOURCE AUTOMATION THROUGH DATA INPUT / OUTPUT WORKLOAD ANALYSIS AND FORECASTING

BACKGROUND

Enterprises that use storage systems to meet their business needs often experience an increase in storage traffic as a result of increasing business demands. Such customers typically scale up or scale out their storage systems, or use additional Infrastructure as a Service (IaaS) services from various cloud providers, using over provisioning. The workload pattern, size and variety of storage traffic undergo complex changes over time that are hard to detect and consequently can significantly degrade the performance of the storage area network (SAN), network attached storage (NAS) or cloud storage over time.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
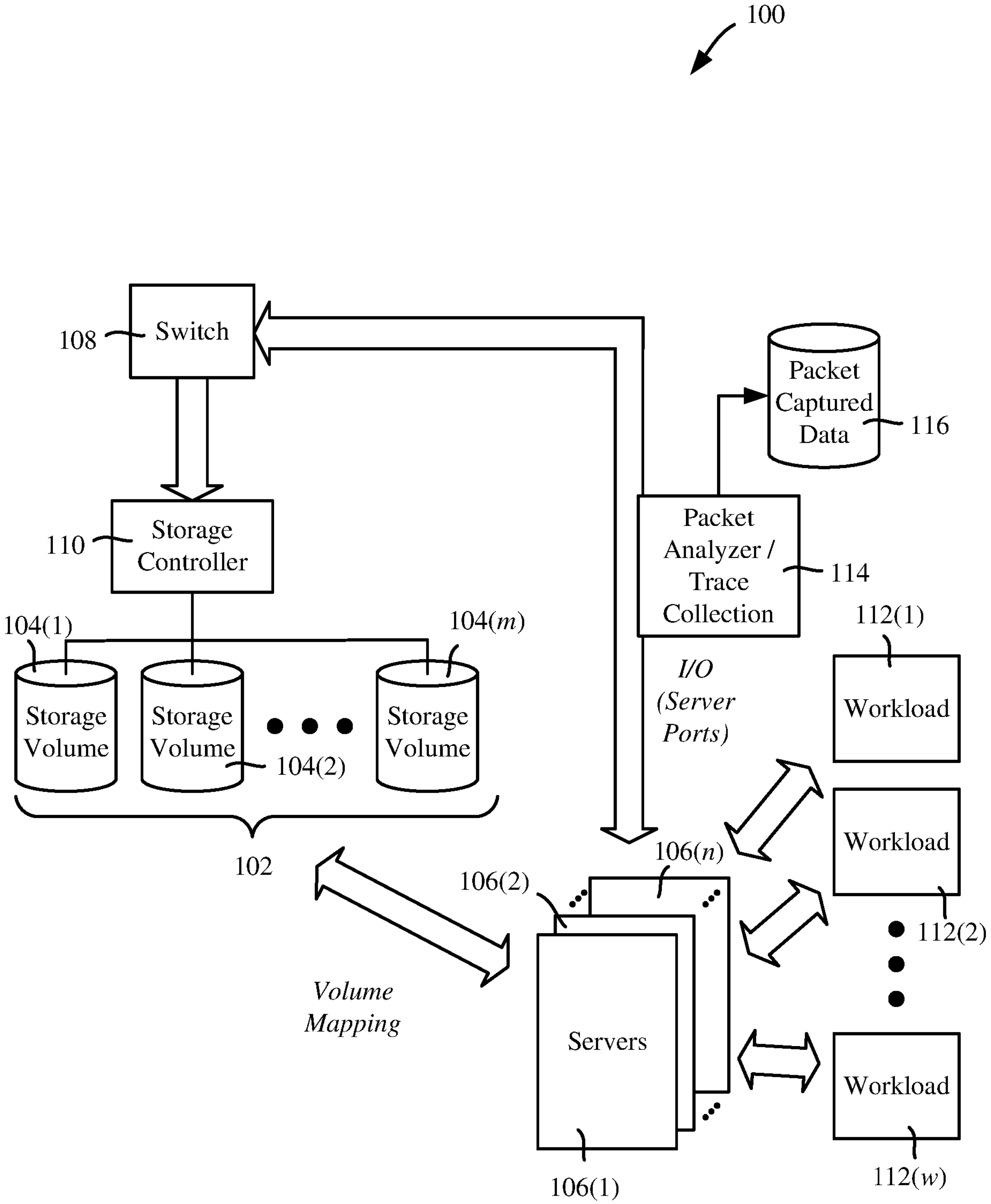
FIG. 1 is a block diagram showing an example system configured for workload data collection with respect to input/output (I/O) data in a storage system, in accordance with various embodiments and implementations of the subject disclosure.

Various aspects of the technology described herein are generally directed towards more efficient storage usage based on policy-based resource automation through input/output (I/O) workload analysis and forecasting, as well as resource usage analysis. Examples of resultant policy recommendations for I/O patterns can include caching recommendations, tiering recommendations, RAID/mirroring recommendations, erasure coding recommendations, data compression/data deduplication recommendations, and so on. Another example of automated policy includes decisions related to read-ahead data regions, which is based on forecasting. Examples of resultant policy recommendations for resources can include scale up/down or scale out recommendations based on load and latency, based on workload type. Other policy recommendations can be made that are applicable to meet an enterprise's performance and cost needs.

As mentioned in the background, for any given enterprise (e.g., storage array customer), the workload pattern, size and variety of storage traffic can vary over time. In general, storage systems are designed for general policies which are applied to the workloads. However, determining the application and workload type is challenging for various reasons, including that enterprises may utilize their underlining storage in many different and unforeseen ways, and because the host operating system can hide storage metadata through layers of abstraction, such as the volume manager and filesystem. Further, in a block storage device, discrete block I/O requests may arrive from multiple hosts and applications, in any order, and the associated I/O streams may exhibit very different characteristics. Still further, the host and device drivers communicate with the storage system using protocols such as Network File System (NFS), Server Message Block (SMB), Small Computer System Interface (SCSI) and Non-Volatile Memory Express (NVME), which provide very little information to the storage controller with which the controller can determine the type of application using the storage system. The lack of knowledge of how a storage system is used by enterprise applications causes inefficiencies in resource utilization.

In sum, storage arrays are unaware of the applications and workloads that initiate I/O requests to volumes stored on the array. As a result, the ability of a storage array to make performance-related decisions and tune relevant parameters is highly restricted. Example negative implications can include erroneous data placement, inefficient utilization of system resources, performance problems such as write amplification due to unnecessary data movement across tiers, unnecessary overhead such as compression or deduplication of hot data, missed opportunities for optimization such as prefetching sequentially-accessed data to reduce read data latency, and many others.

Accordingly, described herein is the automating of policies to increase, decrease or modify various resource usage and allocations on storage systems or Infrastructure as a Service (IaaS) cloud-based systems. In one implementation, an automation system takes inputs from a multistage AI/ML (artificial intelligence/machine learning) pipeline that uses different models/processing techniques at different stages based on workload pattern data, load data and latency data. For example, I/O forecasting is performed using combination of multiple timeseries and artificial neural network (ANN) processes. The multistage model provides recommendations of policy based on its learning from data. Policies are defined that can be recommended for different types of workloads, thus improving the overall system utilization and performance, instead of attempting to use a general-purpose solution.

It should be understood that any of the examples and/or descriptions herein are non-limiting. Thus, any of the embodiments, example embodiments, concepts, structures, functionalities or examples described herein are non-limiting, and the technology may be used in various ways that provide benefits and advantages in computing and data storage in general.

Reference throughout this specification to "one embodiment," "an embodiment," "one implementation," "an implementation," etc. means that a particular feature, structure, characteristic and/or attribute described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, characteristics and/or attributes may be combined in any suitable manner in one or more embodiments/implementations. Repetitive description of like elements employed in respective embodiments may be omitted for sake of brevity.

The detailed description is merely illustrative and is not intended to limit embodiments and/or application or uses of embodiments. Furthermore, there is no intention to be bound by any expressed or implied information presented in the preceding sections, or in the Detailed Description section. Further, it is to be understood that the present disclosure will be described in terms of a given illustrative architecture; however, other architectures, structures, materials and process features, and steps can be varied within the scope of the present disclosure.

It also should be noted that terms used herein, such as "optimize," "optimization," "optimal," "optimally" and the like only represent objectives to move towards a more optimal state, rather than necessarily obtaining ideal results. For example, "storage optimization" means providing recommendations that will improve how storage and resources can be used for more efficient access to stored data, subject to an enterprise's expense limitations, rather than necessarily achieving an optimal result. Similarly, "maximize" means moving towards a maximal state (e.g., up to some processing capacity limit), not necessarily achieving such a state, and so on.

The following detailed description is merely illustrative and is not intended to limit embodiments and/or application or uses of embodiments. Furthermore, there is no intention to be bound by any expressed or implied information presented in the preceding sections, or in the Detailed Description section.

One or more example embodiments are now described with reference to the drawings, in which example components, graphs and/or operations are shown, and in which like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details, and that the subject disclosure may be embodied in many different forms and should not be construed as limited to the examples set forth herein.

FIG. 1 shows an example system 100 including a storage system that includes a storage array 102 arranged as storage volumes 104(1)-104(*m*) via volume mapping. The storage volumes 104(1)-104(*n*) are coupled to servers 106(1)-106(*n*), in this example via a switch 108 and storage controller 110. Note that while the storage volumes 104(1)-104(*m*) are depicted in the example of FIG. 1 as resembling disks, it is understood that any storage devices can be part of the storage array 102, including, but not limited to, hard disk drives, solid state drives (SSDs), cache-related devices such as fast memory, and so forth.

The servers 106(1)-106(*n*) process workloads 112(1)-112(*w*) of various types, such as data streaming type workloads, workloads related to database applications (e.g., web applications, capacity resource planning applications, dynamic website applications, and many others), and so on. The system 100 can also detect whether AI analytics or workloads have been run on the system 100, and appropriately allocate resources, e.g., a specialized processor or the like related to such a workload. As a result, various I/O access patterns to and from workloads 112(1)-112(*w*), through the server servers 106(1)-106(*n*), and from and to the storage volumes 104(1)-104(*n*) are typically present in the system 100.

Described herein is capturing and processing these various I/O access patterns, which is accomplished by a data collection process based on common tools such as dynamic tracing and/or packet analyzers (block 114) placed on server ports or the like for collecting the packets/traces as packet (raw) captured data 116 or the like for a filesystem or storage volume(s). This results in collecting salient data elements such as the operation type (op-code), location in the volume or file, transfer length, timestamp, and so on. As part of processing each I/O operation, several statistics associated with that I/O also may be captured. A list of such statistics can include, but is not limited to filename/volume, timestamp, I/O command (op-code, e.g., read, write etc.), associated offset/logical block address (offset in a datapath's thin address space), associated length, associated pattern (sequential, random) and I/O latency. These data elements and statistics can be used as basic features with respect to machine learning models as described herein.

Figure 2:
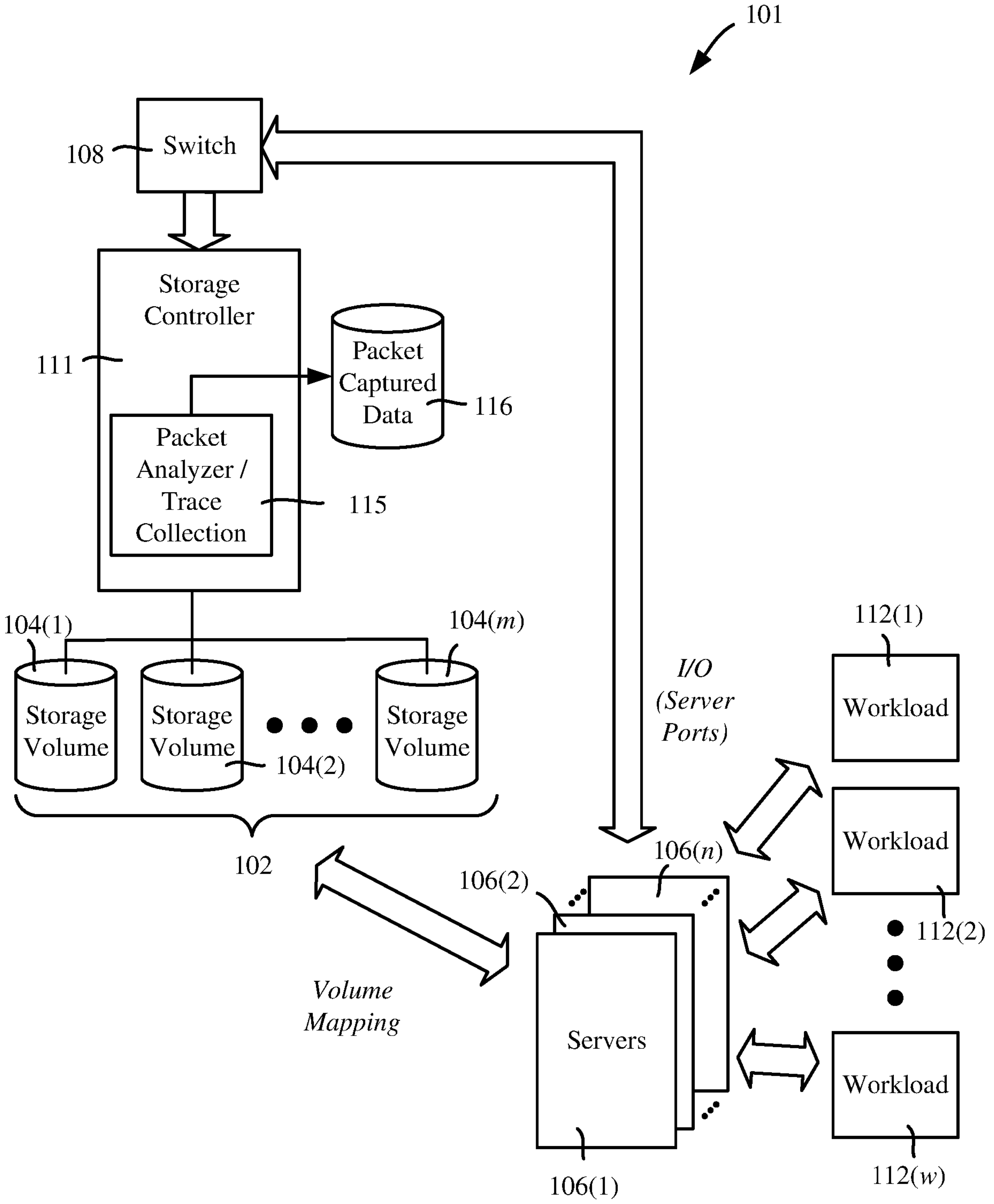
FIG. 2 is a block diagram showing an example system configured for workload data collection with respect to data within a storage system, in accordance with various embodiments and implementations of the subject disclosure.

FIG. 2 is generally similar to FIG. 1, except that a packet analyzer/trace collection module 115 is integrated within (or closely coupled to) a modified storage controller 111 (modified relative to FIG. 1 via the inclusion of the packet analyzer/trace collection module 115) of an alternative system 101. As such, the various other components are not again described in detail for purposes of brevity. Thus, the data used for predictions as described herein can be sampled either inside the system 101 within the storage controller 111 as in FIG. 2 (which provides alternative benefits), or outside the system 100 as in FIG. 1 using external packet capture.

Figure 3:
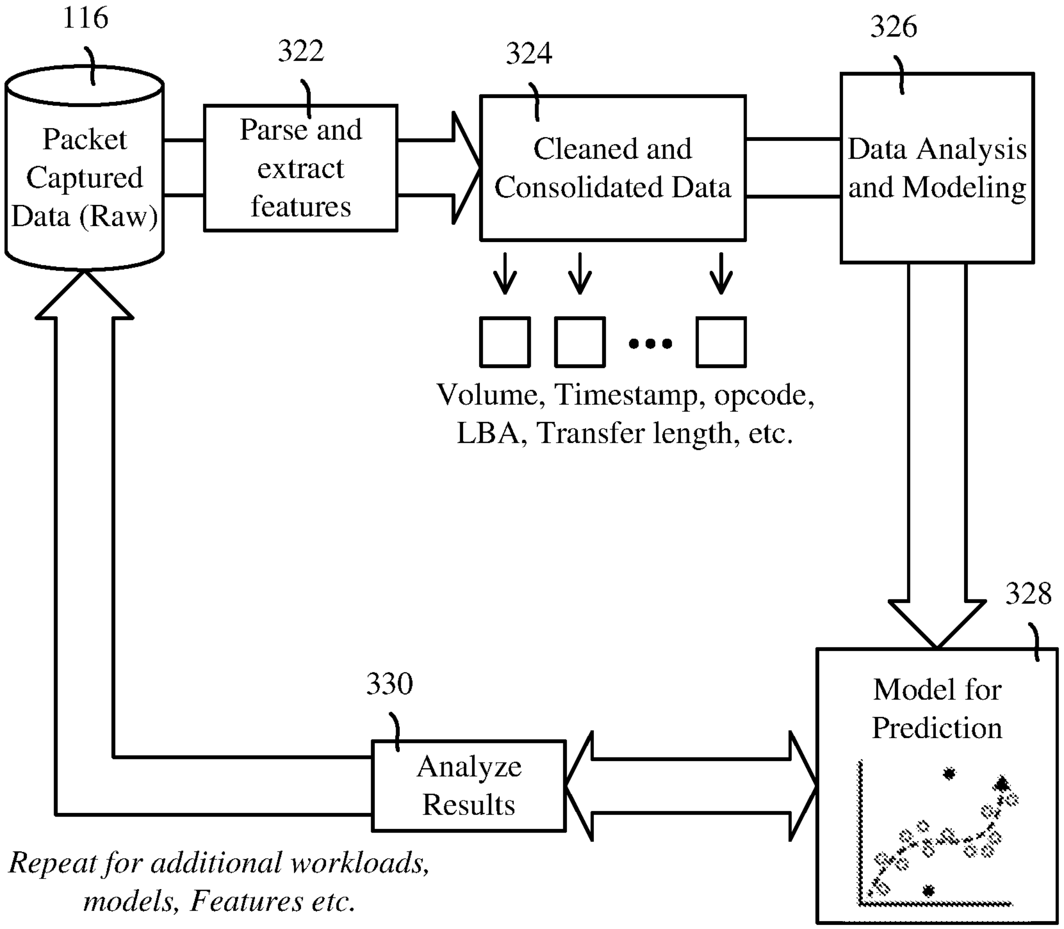
FIG. 3 is a block diagram showing an example configuration for data analysis and model training, in accordance with various embodiments and implementations of the subject disclosure.

The captured data 116 are divided into training information and test data. As shown in FIG. 3, this is after extracting features (block 322) from the data elements of the captured data 116, and cleaning/consolidating the data (block 324) in one or more suitable, well-known ways. The resultant data can have feature datasets, such as including {volume ID, timestamp, op-code, logical block addressing, transfer length, . . . } and so on depending on what features match what elements of a particular data trace/packet. The training information is input along with training labels for known types of feature datasets/data elements/access patterns to train various data analysis and modeling ML/AI processes 326, whereby one or more models 328 are generated.

Via testing, the results of a model may be analyzed (block 330), whereby as shown in FIG. 3, each model may be refined by further training with additional application and workload datasets (new labels), adding more attributes (e.g., feature engineering), adding more training data, and/or tuning the ML/AI models. Model training can be performed as an offline process using a tagged dataset, e.g. a dataset containing I/O statistics and known labels for the application, workloads, access pattern and other relevant attributes. Such tagged data may be generated by customers, (metadata collected from known actual workloads), via integration with other products having installed agents that can extract and share such information, and/or by using ML models, in that following verification of a model, further generated data can be added to the training data.

Figure 4A:
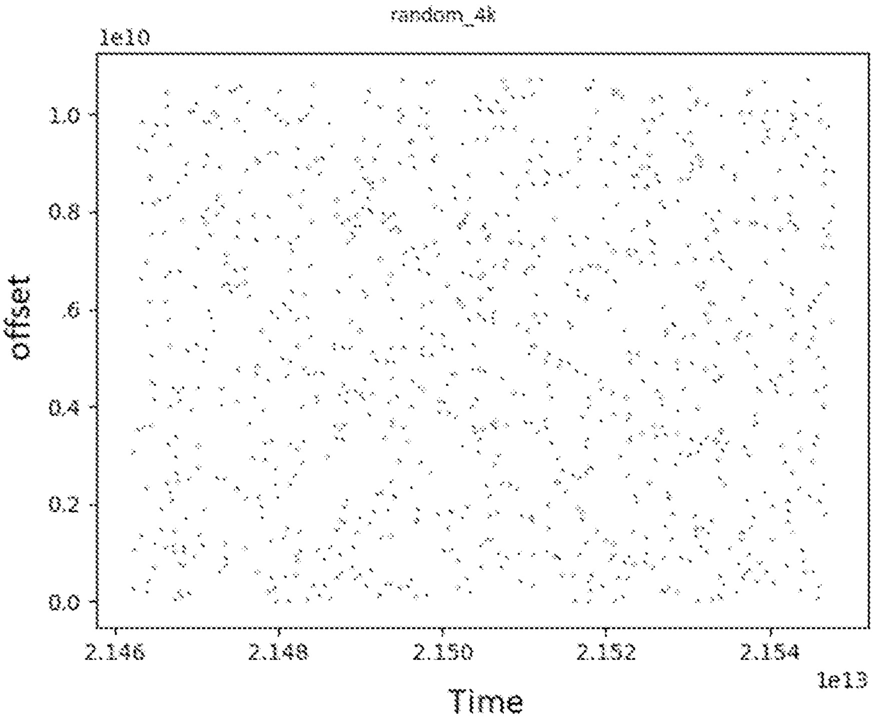
FIGS. 4A and 4B are example graph representations of workload pattern corresponding to random input data, in accordance with various embodiments and implementations of the subject disclosure.
Figure 4B:
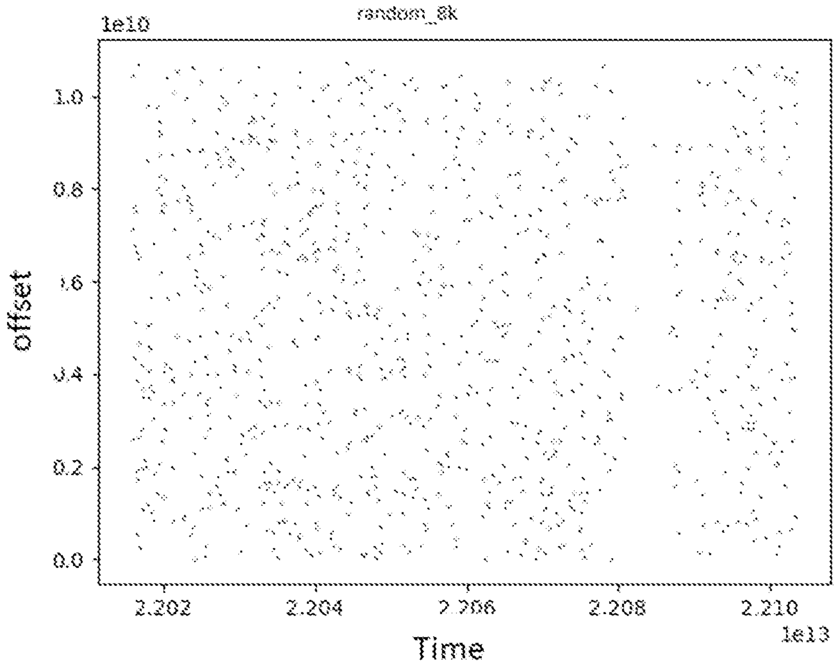
Figure 5A:
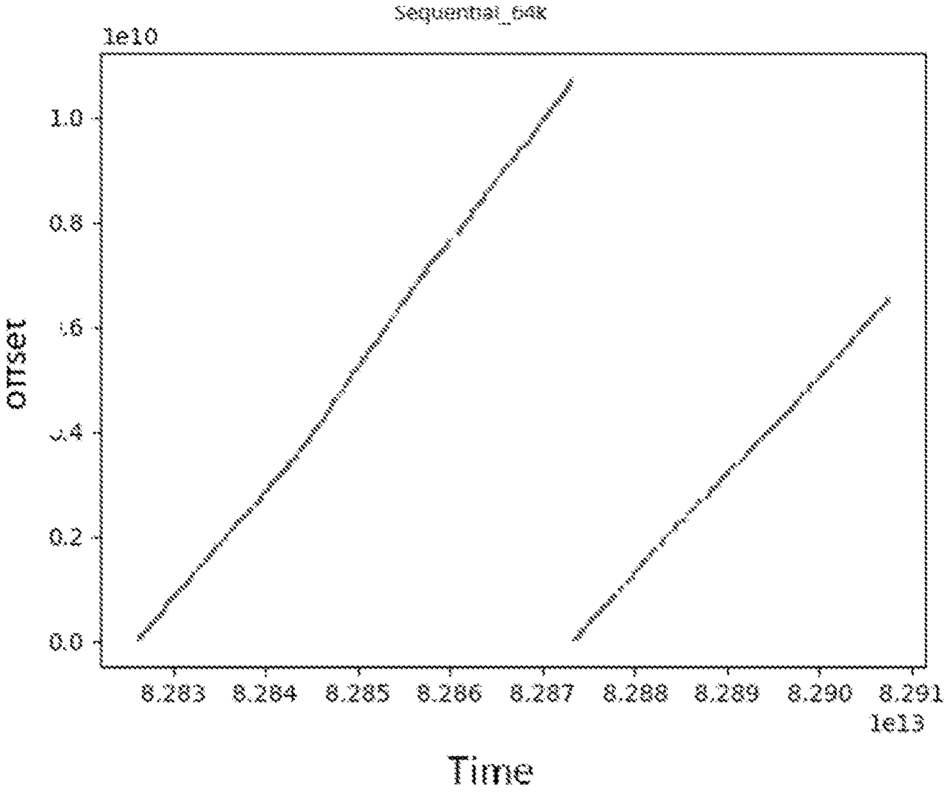
FIGS. 5A and 5B are example graph representations of workload pattern corresponding to sequential input data, in accordance with various embodiments and implementations of the subject disclosure.
Figure 5B:
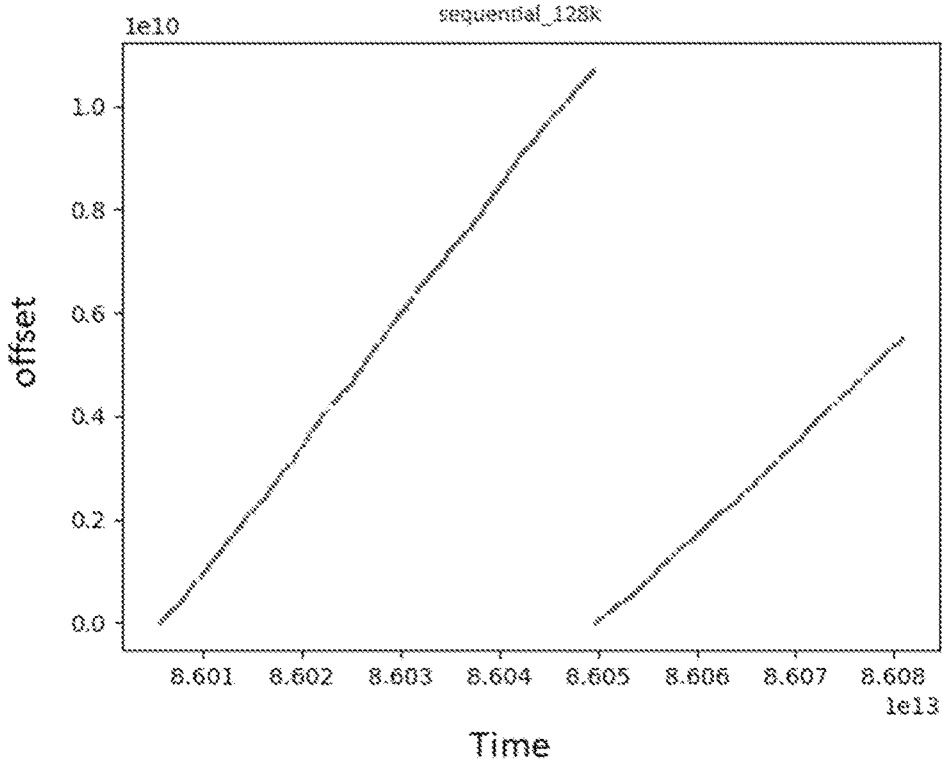

By way of examples of different I/O access patterns, FIGS. 4A and 4B show sample workload pattern data obtained from captured input data over time, where the file offset/block offset locations indicate random access patterns for different data storage transfer sizes. In contrast, the examples of FIGS. 5A and 5B show sample workload pattern data obtained from captured input data over time, in which the file offset/block offset locations indicate sequential access patterns. As described herein, one or more classification models may be used to classify such workload data into different types of access patterns.

For example, in differentiating raw workload data, machine learning models for classification and regression may be used. Classification models can be used for example to detect application, workload type or access patterns. Regression models can be used, for example, to tune parameters and settings, such as a compression level for a set of data, to a more optimal value. Ensemble methods such as random forest (a collection of decision trees) are suitable candidates for correctly resolving such varied input because of their simplicity, speed and lower risk of overfitting. The training process can be scaled by running it in parallel on multiple cores, and may also be distributed to multiple nodes. In actual implementations, very high classification accuracy was obtained with a machine learning classification model trained to differentiate among different kinds of workloads, including, for example, random read (4K) data, random read (8K) data, random read (64K) data, random read (128K) data, sequential read (64K) data and sequential read (128K) data. If additional precision is desired, deep learning models may be used, with the optional use of GPUs to accelerate the training process.

Thus, each workload has its own characteristics and can have different parameters and settings to track in target devices, whereby a single process or level of analysis is not sufficient. Described herein is a multi-stage framework and pipeline technology, including various stages to determine parameters, which are useful for determining resulting policy recommendations. As will be seen, via the technology described herein, data goes through multiple stages of processing, where in each stage, there may be different AI/ML models making decisions, with each workload/access pattern type branching out to its own branch in stages of the pipeline, each branch having different workload-determined sets of additional AI/ML models to make further decisions.

The framework and pipeline are based on application and workload data collection, data analysis using machine learning and other methodologies, and utilization of information to automate policy decisions, which can drive many business benefits. Prior to the pipeline, preparation stages can include volume/application tagging, data collection and/or feature extraction, including for creating a training set to generate time series ML models for classification and forecasting as generally described with reference to FIG. 3.

Once the models are sufficiently trained and tested, actual workload data is processed. A first stage of the pipeline uses trained ML classification and regression models to provide metadata about storage objects, such as volumes and files, as well as to classify different workloads into different I/O access patterns. Note that I/O patterns can be sampled for feeding into the model for classification and forecasting. Thereafter, the pipeline stages' results are used by an automation framework to drive pre-defined policies based on the information provided by the AI/ML models.

Figure 6:
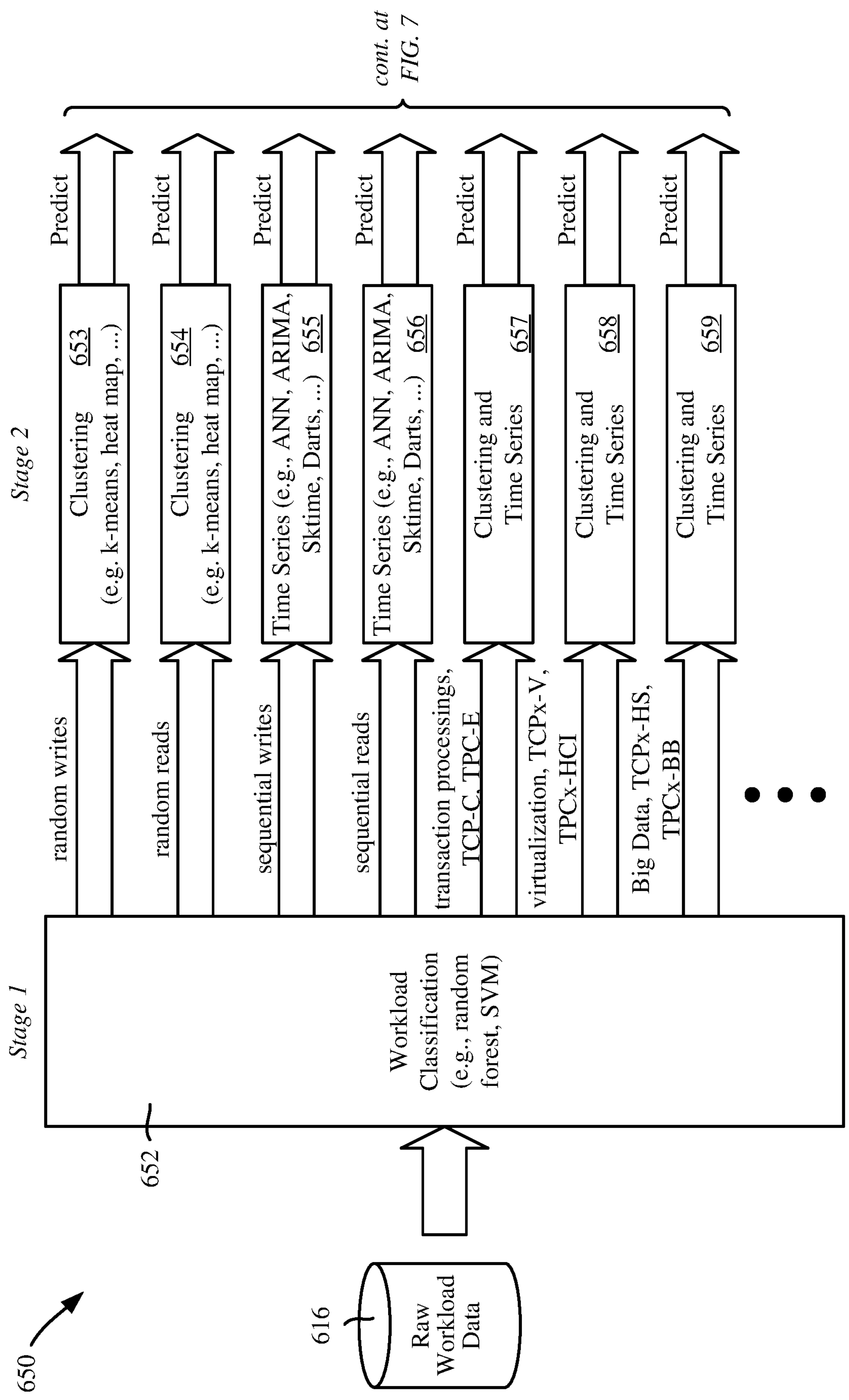
FIGS. 6 and 7 comprise a block diagram showing an example pipeline of trained models for inputting I/O data and outputting prediction and policy recommendations, in accordance with various embodiments and implementations of the subject disclosure.
Figure 7:
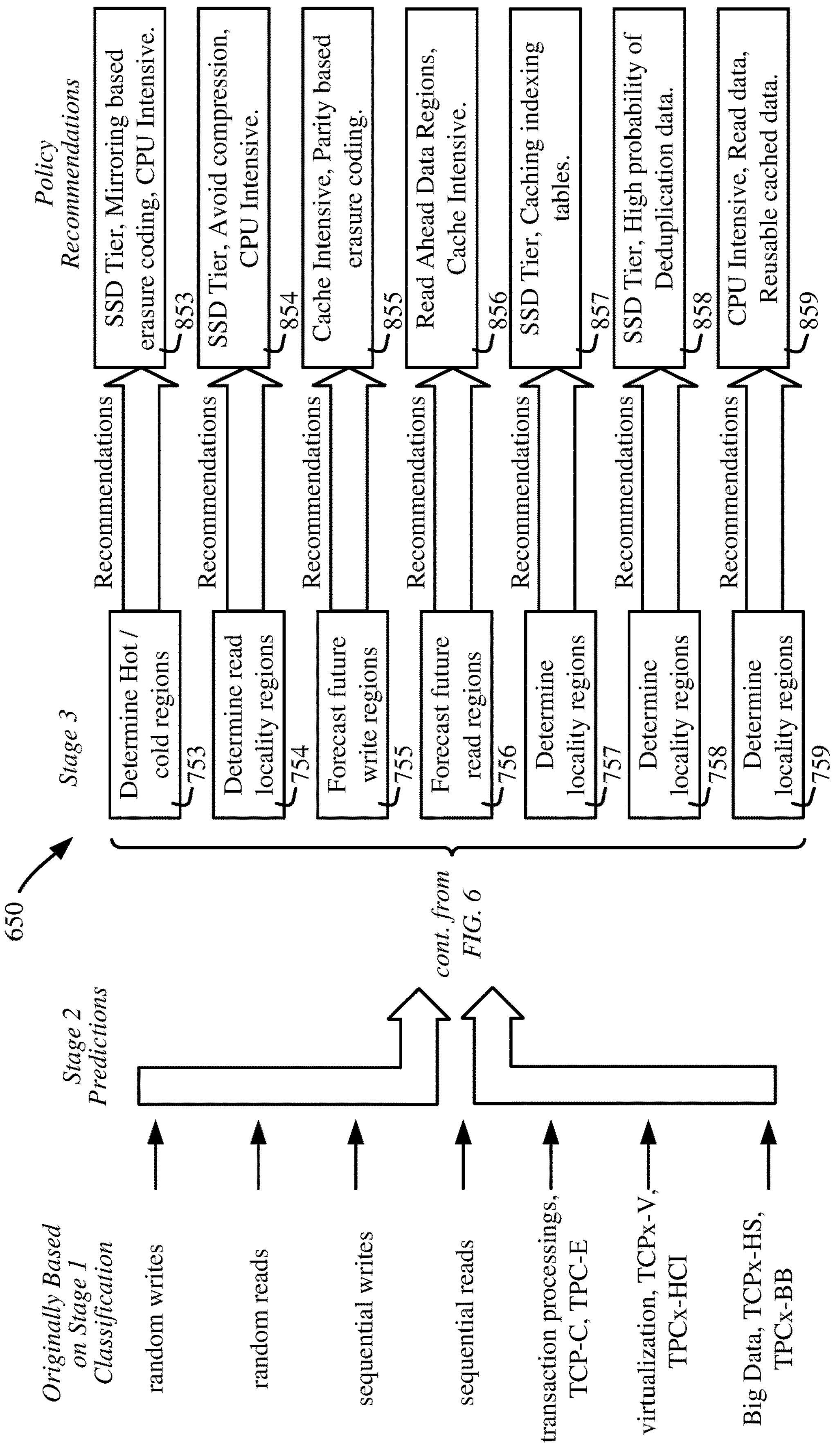

With respect to storage considerations and/or making storage usage more efficient, as represented in the multistage pipeline 650 example of FIGS. 6 and 7, I/O traces/packets of (raw workload data 616) of unknown I/O workloads are collected and classified in a first stage (stage 1) by one or more trained classification models (block 652) based on their I/O access patterns (which act as "fingerprints" or "signatures"). Suitable machine learning classification models include decision trees (including random forest-based decision trees), support vector machines (SVM), regression models, and so forth. Example regression models can be based on linear regression, logistic regression, ridge regression, lasso regression, polynomial regression, and/or Bayesian linear regression.

As shown in the example of FIGS. 6 and 7, examples of different types of I/O access patterns classified from the raw workload data 616 can include, but are not limited to, random writes, random reads, sequential writes, sequential reads, transaction processing, virtualization and big data; (big data has been generally defined as extremely large and diverse amounts of structured, unstructured, and semi-structured data that often continues to grow exponentially over time. Also, as mentioned above, AI workloads can be detected for subsequent (e.g., resource-related) policy recommendations. Note that "TCP" in FIGS. 6 and 7 refers to different transaction processing and database benchmarks, defined by the Transaction Processing Performance Council, so that the access pattern feature data/performance is standardized/consistent in the pipeline with respect to these types of data.

As shown in FIGS. 6 and 7, the classification output data from stage 1 is input into the stage 2 models. More particularly, depending on the type of I/O access pattern, further processing and analysis is performed by appropriate (stage 2) models 653-659 for the type of access pattern data, such as clustering models 653 and 654 (e.g. k-means, heat map, . . . ) or regression models for random reads and writes. Time series models 655 and 656 (e.g., ANN, ARIMA, Sktime, Darts, . . . ) are deemed more appropriate for sequential reads and writes. A combination of clustering and time series models 657-659 are more appropriate for transactional data I/O, virtualization and big data. Other access patterns exist, and can have suitable models trained for those patterns.

In addition to the models mentioned herein, other suitable models may be used, and thus those mentioned herein are only non-limiting examples. For example, in addition to heat map or k-means models, other non-limiting example clustering models can be models based on density-based clustering, Gaussian mixture models, balance iterative reducing and clustering using hierarchies, affinity propagation clustering, mean-shift clustering, hierarchical clustering and so on. Example regression models can be based on linear regression, logistic regression, ridge regression, lasso regression, polynomial regression, and/or Bayesian linear regression.

As shown in the right side of FIG. 7 (in which the pipeline 650 is continued from FIG. 6), the output from stage 2 results in determinations or predictions (and forecasting for I/O patterns such as sequential reads and writes) 753-759, which via stage 3 of the pipeline can be mapped by a framework to storage-related, predefined policy recommendations 853-859. For example, in FIGS. 6 and 7, for workload data classified as random writes, the stage 2 (e.g., clustering) model 653 outputs data representing hot and cold regions 753, and for random reads the stage 2 (e.g., clustering) model 654 outputs data representing read locality regions. Continuing with the example, for sequential writes, the stage 2 (e.g., time series) model 655 outputs data representing forecast data 755 for future write regions, and for sequential reads the stage 2 (e.g., time series) model 656 outputs forecast data 756 for future read regions. Further continuing with the example, the models 657-659 output data representing datasets of determined locality data 757-759 for transactional data, virtualization data, and big data, respectively.

Figure 8:
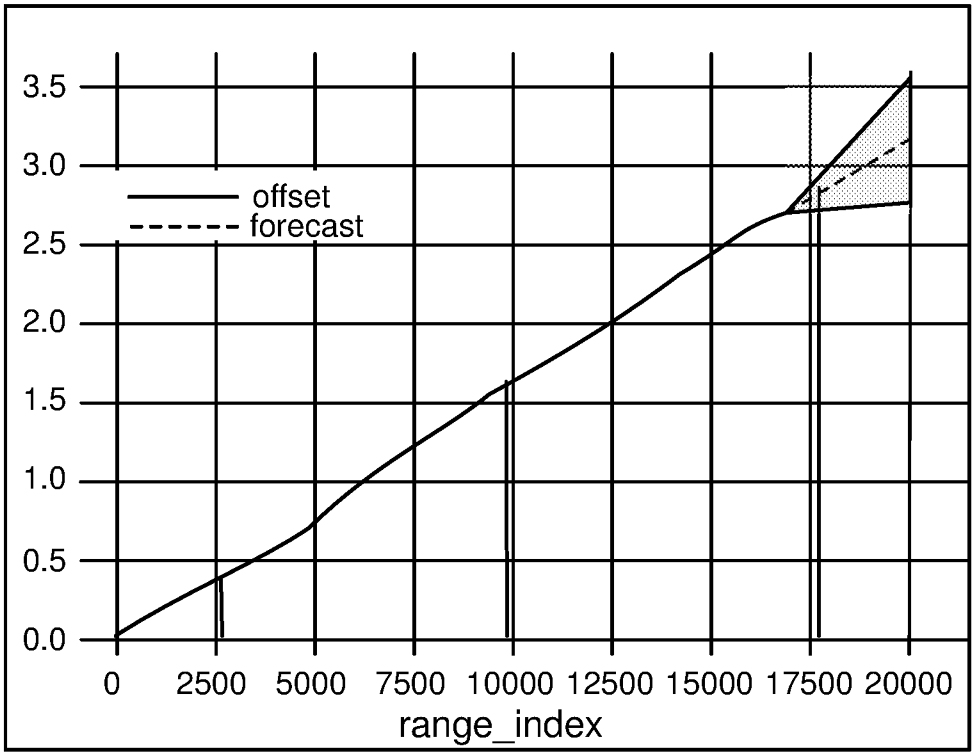
FIG. 8 is an example graph representation of time series-based forecasting of a sequential workload, in accordance with various embodiments and implementations of the subject disclosure.

Based on analyzing the stage 3 data output, which can be via trained models, policy recommendations can be generated that are based on the classification and its modeling results, e.g., which data of a given type is accessed frequently with respect to I/O. In FIG. 7, block 753, for random write data the hot regions can, for example, be mapped to an SSD tier for fast writing (as opposed to the slow seek time to find write locations on a disk), and mirroring-based erasure coding can be used for fast data protection of random data; CPU usage is also high, so the CPU usage (and number available for use) should be analyzed as described below with reference to FIG. 8. The cold regions can be handled differently, e.g., written to less expensive disk storage, possibly stored based on parity-based erasure coding that saves storage space but is slower than mirroring. Misuse of tiering, the cache(s), data protection schemes, compression, deduplication and so on can be diagnosed relative to what is recommended.

In FIG. 7, block 754, for random read data, read locality regions for frequently accessed (and/or possibly recently accessed) data can be mapped to an SSD tier for fast reading; note that caching is generally not desirable for random reads because there are a lot of cache misses with random reads of large amounts of data, unless a very large, costly amount of cache memory is used. Compression should be avoided for frequently read data, as decompression takes time and resources. CPU usage is also high for reading frequently accessed data, so the CPU usage should be analyzed to see if sufficient CPU resources are present, or if more are needed.

Continuing with this example, time-series forecasted future write regions (block 755) for sequential write data corresponds to cache intensive usage, whereby cache memory usage should be analyzed so that a sufficient amount is available, and used, for example, with parity-based erasure coding (block 855), as striping is fast in the cache. Time-series forecasted future read regions (block 756) for sequential read data corresponds to example block 856 for providing read ahead data regions, and is cache intensive, whereby the amount of available cache space should be analyzed.

Figure 9:
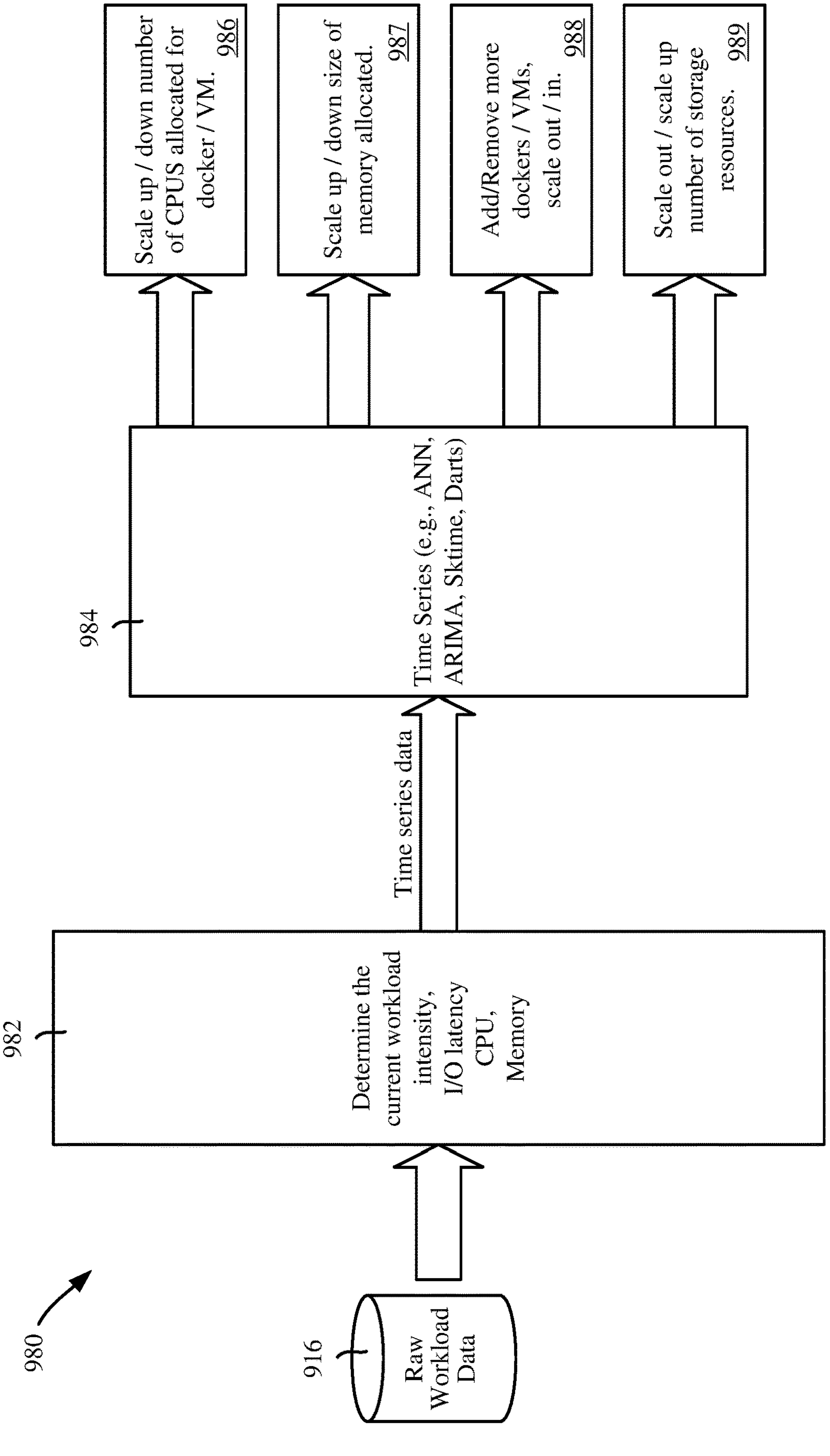
FIG. 9 is a block diagram showing an example data-based pipeline of pipeline of trained time-series model for inputting resource usage data and outputting policy recommendations, in accordance with various embodiments and implementations of the subject disclosure.

FIG. 9 is an example graph representation of time series-based forecasting via an ARIMA model for a sequential workload. As can be seen, the model forecasts an increase in offset based on an increasing range index.

Returning to FIGS. 6 and 7, analyzing locality regions (block 757 of FIG. 7) for transactional data storage can result in recommendations to use an SSD tier for highly-accessed data rather than disk, along with the use of caching indexing tables. Locality regions (block 758) for virtualization storage data can result in recommendations to use an SSD tier for highly-accessed data rather than disk, along with a high probability of benefitting from deduplication of data. Locality regions (block 758) for big data storage can result in recommendations to evaluate CPU usage, and consider reusable cached data with respect to read data.

Load balancing can also be a recommendation for frequently read or written data. This allows more distributed resources to be used in parallel rather than accessing a smaller set of resources over and over for the same data.

With respect to resources such as CPU, memory, docker containers/virtual machines and storage devices, system load monitoring for workload I/O handling can result in similar time-series based predictions as to resource-related policy recommendations. FIG. 9 shows a generally similar pipeline 980 to that of FIGS. 6 and 7, but instead is based on raw workload data 916 that is obtained via system monitoring, and is extracted and processed for determining, for example, usage of CPU, memory, docker containers/virtual machines and storage devices. Based on these features, in this example, a trained model 982 determines data representing the current workload intensity, I/O latency, and usage of CPU, and memory for a series of system-related data collected over time. Trained time series model(s) 984 process the data, resulting in resource-related recommendations to scale up/or scale down the number of CPUs allocated for docker containers/virtual machines (VMs) (block 986), and to scale up/or scale down the size of memory allocated (block 987). Further resource-related recommendations can include adding or removing docker containers/scale out/in/up/down VMs (block 988), and to scale out/scale up (or scale in/down) the number of storage resources.

There is thus described a multistage pipeline trained by learning from workload-related data, with each stage using AI/ML model(s) to output a set of decisions useful for the next stage. The set of models utilized in the pipeline can be different for different workload types. The technology described herein is generally independent of any controller or device hardware or configuration, and can be applied across multiple product lines. Models can be used for collecting and analyzing timelines and I/O patterns, including classifiers, clustering models and time series models, e.g., based on artificial neural networks (ANN), autoregressive integrated moving average (ARIMA). The determinations/predictions/forecasting results are used by an automated framework for recommending policies based on the different workloads' needs. Policy-based automation decisions can be made by timeseries ML models. Thus, machine learning helps to enable storage optimization recommendations automatically, generally without the need for customer or other human consultation or involvement. The policy recommendations are based on analyzing, classifying and/or forecasting future I/O patterns and resources of workloads to proactively identify problem areas, such as to identify overloaded areas and/or identify ineffective utilizations of resources.

The system is a self-learning system that learns from I/O workloads, and along with providing recommendations, can automate the appropriate settings and apply policies to provide a customer with improved performance and resource utilization, without significant human intervention. Note that such automation may be very specific to the product on which this system is applied, because the way the settings are done are different for different products. For example, with a pscale product there are commands and sysctl-related actions for settings things up, and based on the policy recommendations from the model, these set of commands and settings would change. For example, there is a command to disable the read cache (which can be used if the policy recommends for random workload), and there is a setting to use SSDs for storing data in the case of using commands to disable deduplication, and so on.

It should be noted that the technology described herein can take inputs from the model and recommendations, and applies them to the system not necessarily as global settings, but settings that are applicable for the user or host, which has that specific workload and localized and custom resource allocation for those specific workloads. Thus, the recommendations suggested by the model can be applied to specific products in custom ways specific to that product.

Figure 10:
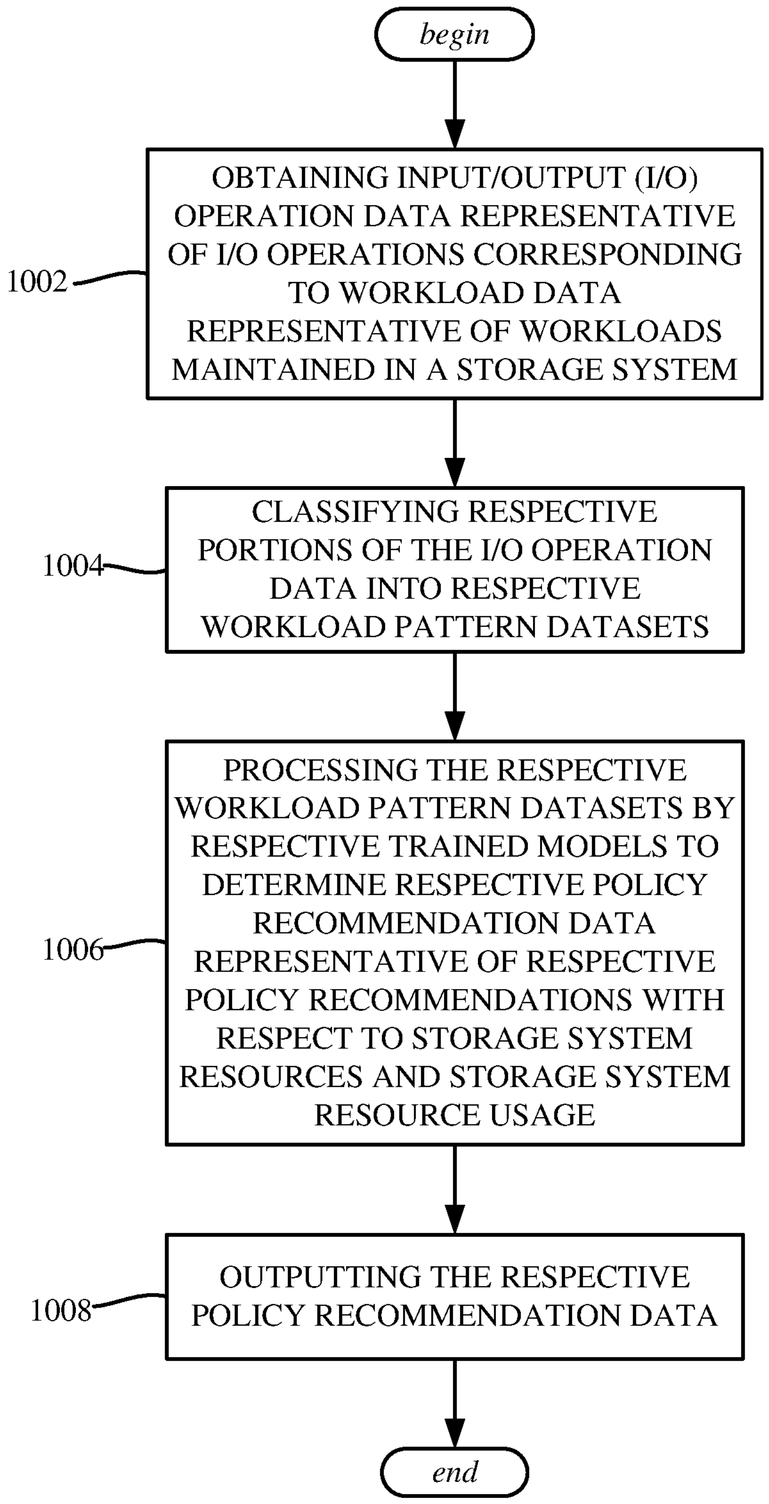
FIG. 10 is a flow diagram showing example operations related to classifying respective I/O operation data into workload pattern datasets that are processed by trained models to determine respective policy recommendation data, in accordance with various embodiments and implementations of the subject disclosure.

One or more concepts described herein can be embodied in a system, such as represented in the example operations of FIG. 10, and for example can include a memory that stores computer executable components and/or operations, and at least one processor that executes computer executable components and/or operations stored in the memory. Example operations can include operation 1002, which represents obtaining input/output (I/O) operation data representative of I/O operations corresponding to workload data representative of workloads maintained in a storage system. Example operation 1004 represents classifying respective portions of the I/O operation data into respective workload pattern datasets. Example operation 1006 represents processing the respective workload pattern datasets by respective trained models to determine respective policy recommendation data representative of respective policy recommendations with respect to storage system resources and storage system resource usage. Example operation 1008 represents outputting the respective policy recommendation data.

Classifying the respective portions can include classifying one workload pattern dataset of the respective workload pattern datasets as: random write data representative of at least one random write, random read data representative of at least one random read, sequential write data representative of at least one sequential write, or sequential read data representative of at least one sequential read.

Classifying the respective portions can include classifying one workload pattern dataset of the respective workload pattern datasets as: transaction-related data related to at least one transaction, virtualization-related data related to at least one virtualization, or big data of at least a defined size.

Determining the respective policy recommendation data can include predicting, by the respective trained models, respective storage region data representative of respective storage regions, and the respective policy recommendation data can be determined based on the respective storage region data. Predicting the respective storage region data can include predicting at least one of: hot storage region data representative of at least one hot storage region, cold storage region data representative of at least one cold storage region, future write storage region data representative of at least one future write storage region, future read storage region data representative of at least one future read storage region, or locality storage region data representative of at least one locality storage region.

Determining the respective policy recommendation data can include determining at least one of: storage-related tier data representative of at least one storage-related tier, storage-related mirroring data related to storage mirroring, storage-related erasure coding data related to storage erasure coding, storage-related deduplication data related to storage deduplication, storage-related compression data related to storage compression, storage cache-related data related to at least one storage cache, storage-related read ahead region data related to at least one storage read ahead region, storage-related deduplication data related to storage deduplication, or processing usage data related to usage of at least one processing unit.

Determining the respective policy recommendation data can include determining at least one of: recommended processor resources, recommended memory resources, recommended storage device resources, recommended virtual machines, or recommended docker containers.

The respective trained models can include at least one of: at least one clustering model, or at least one time series analysis model.

Obtaining the I/O operation data can include obtaining at least one of: workload intensity data representative of at least one intensity associated with at least one workload, I/O latency data representative of at least one latency associated with at least one I/O operation of the I/O operations, processing unit usage data related to usage of at least one processing unit, or memory usage data related to usage of at least one storage unit.

Obtaining the I/O operation data can include obtaining, for respective I/O operations, at least one of: respective filename data representative of respective filenames, respective volume data representative of respective volumes, respective timestamp data representative of respective timestamps, respective I/O command data representative of respective I/O commands, respective offset data representative of respective offsets, respective logical block addressing data representative of respective logical block addresses, respective length data representative of respective lengths of the I/O operations, respective pattern data representative of respective patterns associated with the I/O operations, or respective I/O latency data representative of respective I/O latencies of the I/O operations.

Obtaining the I/O operation I/O operation data can include using, for any of the I/O operation data exchanged between a server and a storage volume, at least one of: a dynamic tracing tool or a packet analyzer tool.

Figure 11:
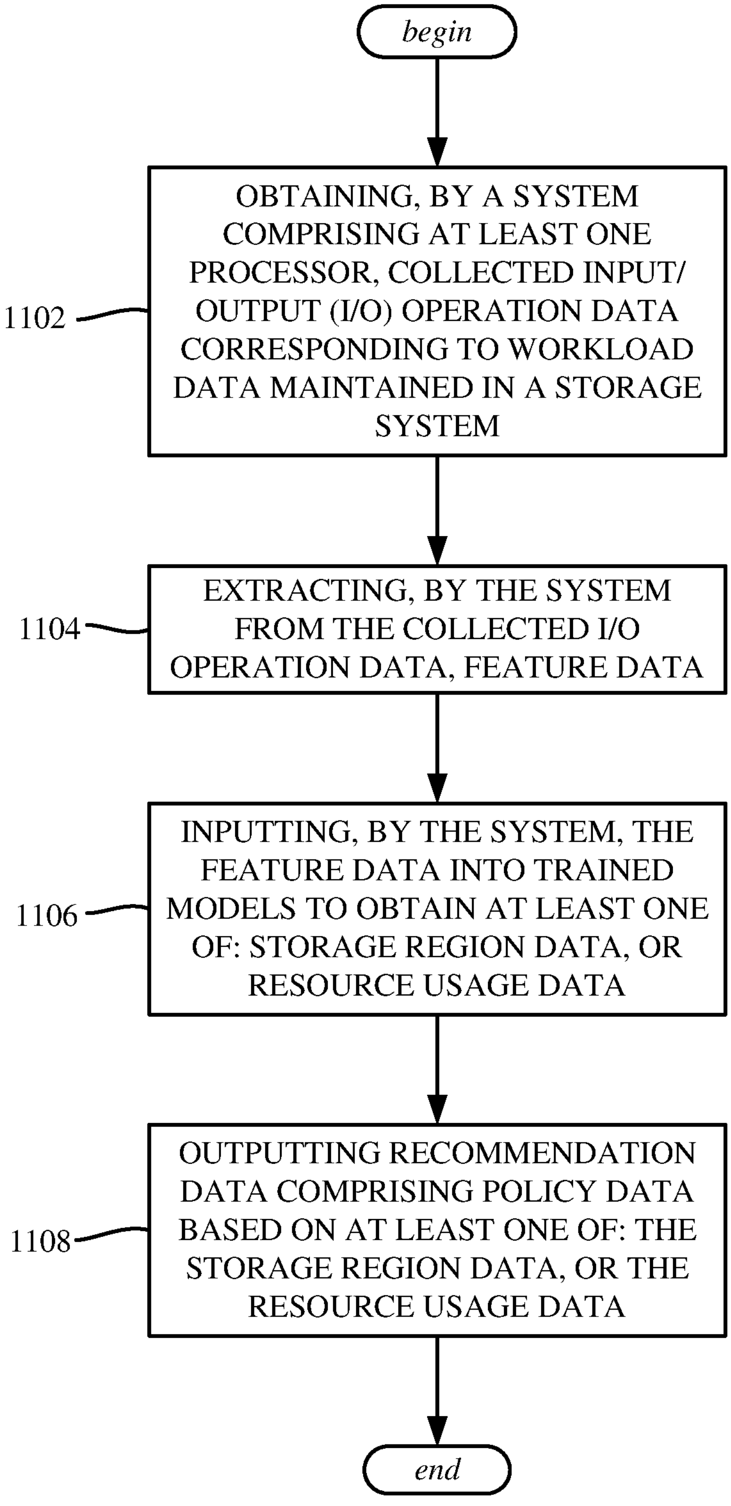
FIG. 11 is a flow diagram showing example operations related to outputting recommendation data/policy data based on storage region data and/or resource usage data, in accordance with various embodiments and implementations of the subject disclosure.

One or more example embodiments, such as corresponding to example operations of a method, are represented in FIG. 11. Example operation 1102 represents obtaining, by a system comprising at least one processor, collected input/output (I/O) operation data corresponding to workload data maintained in a storage system. Example operation 1104 represents extracting, by the system from the collected I/O operation data, feature data. Example operation 1106 represents inputting, by the system, the feature data into trained models to obtain at least one of: storage region data, or resource usage data. Example operation 1108 represents outputting recommendation data comprising policy data based on at least one of: the storage region data, or the resource usage data.

Inputting the feature data into the trained models can include inputting the feature data into at least one of: a time series model, a neural network mode, a clustering model, or a regression model.

Outputting the recommendation data can include outputting policy data for at least one of: storage-related tier data, storage-related mirroring data, storage-related erasure coding data, storage-related deduplication data, storage-related compression data, storage cache-related data, storage-related read ahead region data, storage-related deduplication data, processor data, memory data, storage device data, virtual machine data, or docker container data.

The feature data can include sequential write data and sequential read write data, the storage region data can include forecasted future write region data based on the sequential write data, and forecasted future read region data based on the sequential read data; inputting the feature data into the trained models can include inputting the feature data into time series models, and outputting the recommendation data can include outputting first policy data corresponding to cache usage data and using parity-based erasure coding for the forecasted future write region data, and outputting second policy data corresponding to cache usage data and read ahead data region data for the forecasted future read region data.

The feature data can include random write data and random read write data, the storage region data can include hot region data and cold region data based on the random write data, and read locality region data based on the random read data; outputting the recommendation data can include outputting first policy data corresponding to first tier usage data and using data mirroring for the hot region data, and outputting second policy data corresponding to second tier usage data and avoiding using compression for the read locality region data. Inputting the feature data into the trained models can include inputting the feature data into at least one of: a clustering model, a regression model, or a heat map model.

Figure 12:
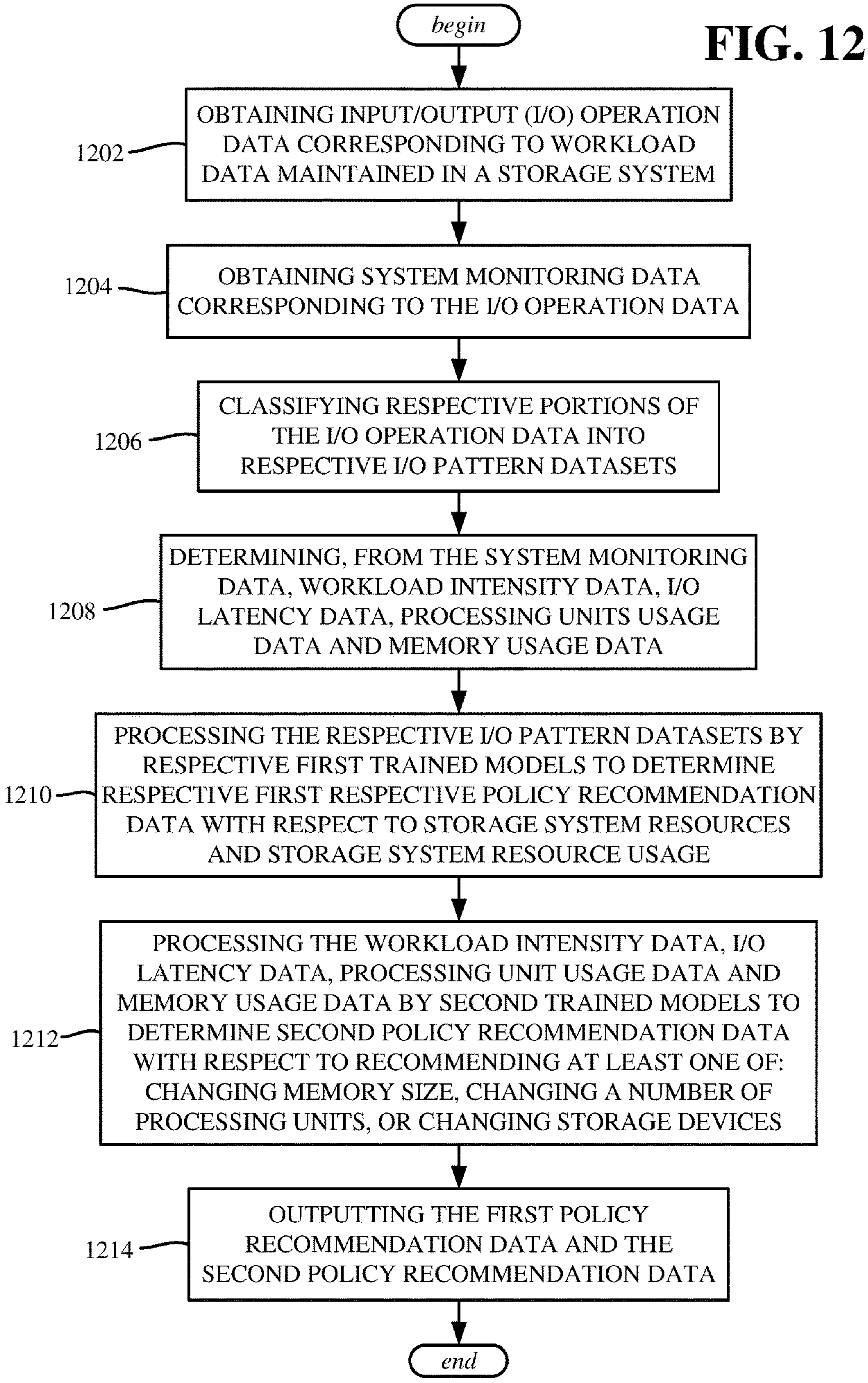
FIG. 12 is a flow diagram showing example operations related to outputting policy recommendation data based on I/O operation data and system monitoring data, in accordance with various embodiments and implementations of the subject disclosure.

FIG. 12 summarizes various example operations, e.g., corresponding to a machine-readable medium, comprising executable instructions that, when executed by at least one processor, facilitate performance of operations. Example operation 1202 represents obtaining input/output (I/O) operation data corresponding to workload data maintained in a storage system. Example operation 1204 represents obtaining system monitoring data corresponding to the I/O operation data. Example operation 1206 represents classifying respective portions of the I/O operation data into respective I/O pattern datasets. Example operation 1208 represents determining, from the system monitoring data, workload intensity data, I/O latency data, processing units usage data and memory usage data. Example operation 1210 represents processing the respective I/O pattern datasets by respective first trained models to determine respective first respective policy recommendation data with respect to storage system resources and storage system resource usage. Example operation 1212 represents processing the workload intensity data, I/O latency data, processing unit usage data and memory usage data by second trained models to determine second policy recommendation data with respect to recommending at least one of: changing memory size, changing a number of processing units, or changing storage devices. Example operation 1214 represents outputting the first policy recommendation data and the second policy recommendation data.

Processing the respective I/O pattern datasets can include inputting the respective I/O pattern datasets into at least one of: clustering models, regression models, or time series models to determine at least one of: storage region data, locality region data, or forecast region data; the first respective policy recommendation data can be based on the at least one of the: storage region data, locality region data or forecast region data.

Classifying the respective portions can include classifying the respective I/O pattern datasets into at least one of: random write data, random read data, sequential write data, sequential read data, transactional data, virtualization-related data, or big data.

As can be seen, the technology described herein facilitates determining policies that operate to better optimize storage system resource utilization, which is automated so that administrators need not know which policies are applicable to which workloads, and when, particularly because updating storage system resource utilization is basically an ongoing process. In addition to existing storage needs, new and emerging technologies such as Big Data, Internet-of-Things and streaming applications consume huge amount of storage space, making the technology described herein valuable in storing such data highly efficiently and with optimal utilization of resources.

Figure 13:
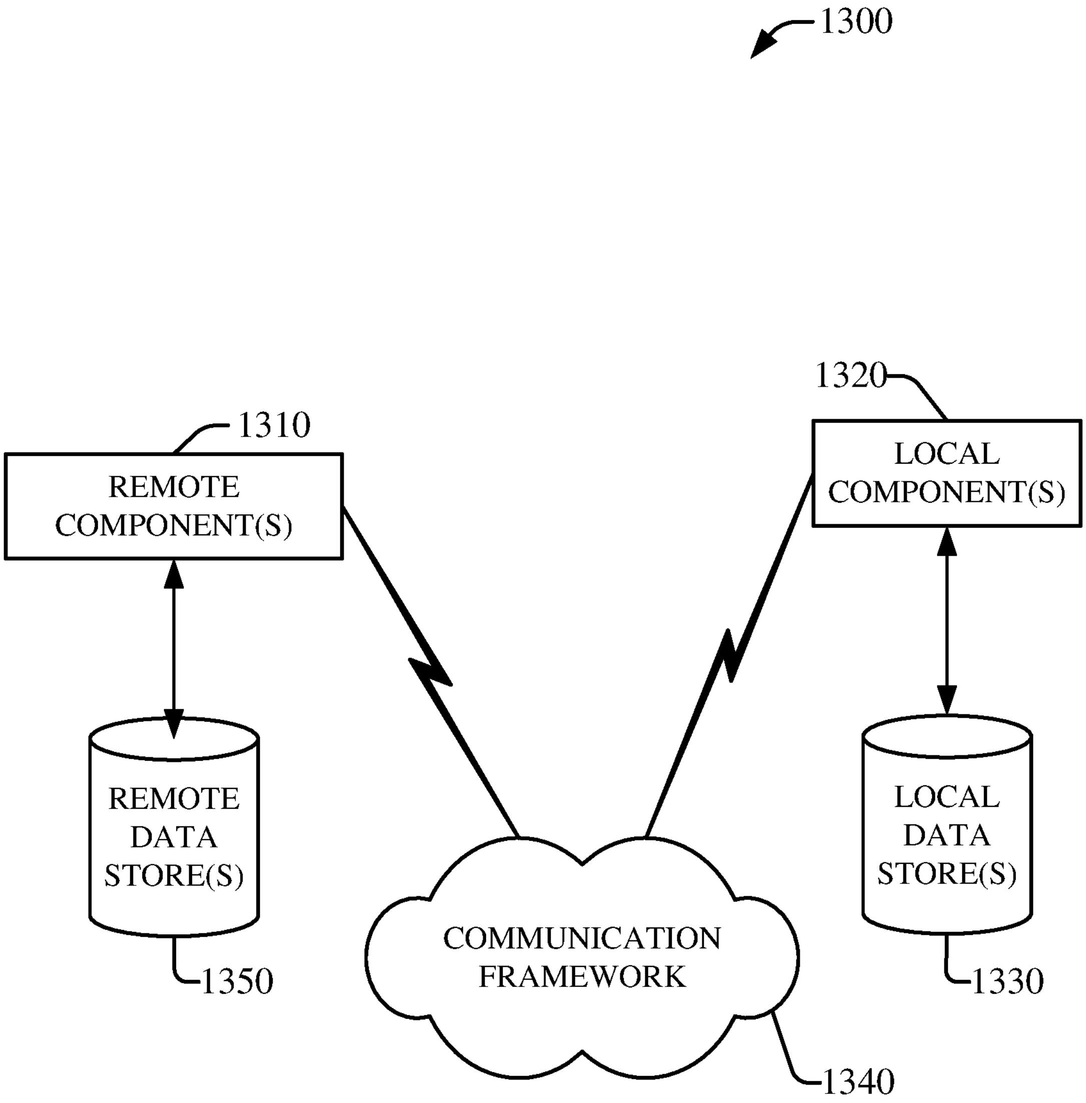
FIG. 13 is a block diagram representing an example computing environment into which embodiments of the subject matter described herein may be incorporated.

FIG. 13 is a schematic block diagram of a computing environment 1300 with which the disclosed subject matter can interact. The system 1300 comprises one or more remote component(s) 1310. The remote component(s) 1310 can be hardware and/or software (e.g., threads, processes, computing devices). In some embodiments, remote component(s) 1310 can be a distributed computer system, connected to a local automatic scaling component and/or programs that use the resources of a distributed computer system, via communication framework 1340. Communication framework 1340 can comprise wired network devices, wireless network devices, mobile devices, wearable devices, radio access network devices, gateway devices, femtocell devices, servers, etc.

The system 1300 also comprises one or more local component(s) 1320. The local component(s) 1320 can be hardware and/or software (e.g., threads, processes, computing devices). In some embodiments, local component(s) 1320 can comprise an automatic scaling component and/or programs that communicate/use the remote resources 1310, etc., connected to a remotely located distributed computing system via communication framework 1340.

One possible communication between a remote component(s) 1310 and a local component(s) 1320 can be in the form of a data packet adapted to be transmitted between two or more computer processes. Another possible communication between a remote component(s) 1310 and a local component(s) 1320 can be in the form of circuit-switched data adapted to be transmitted between two or more computer processes in radio time slots. The system 1300 comprises a communication framework 1340 that can be employed to facilitate communications between the remote component(s) 1310 and the local component(s) 1320, and can comprise an air interface, e.g., Uu interface of a UMTS network, via a long-term evolution (LTE) network, etc. Remote component(s) 1310 can be operably connected to one or more remote data store(s) 1350, such as a hard drive, solid state drive, SIM card, device memory, etc., that can be employed to store information on the remote component(s) 1310 side of communication framework 1340. Similarly, local component(s) 1320 can be operably connected to one or more local data store(s) 1330, that can be employed to store information on the local component(s) 1320 side of communication framework 1340.

Figure 14:
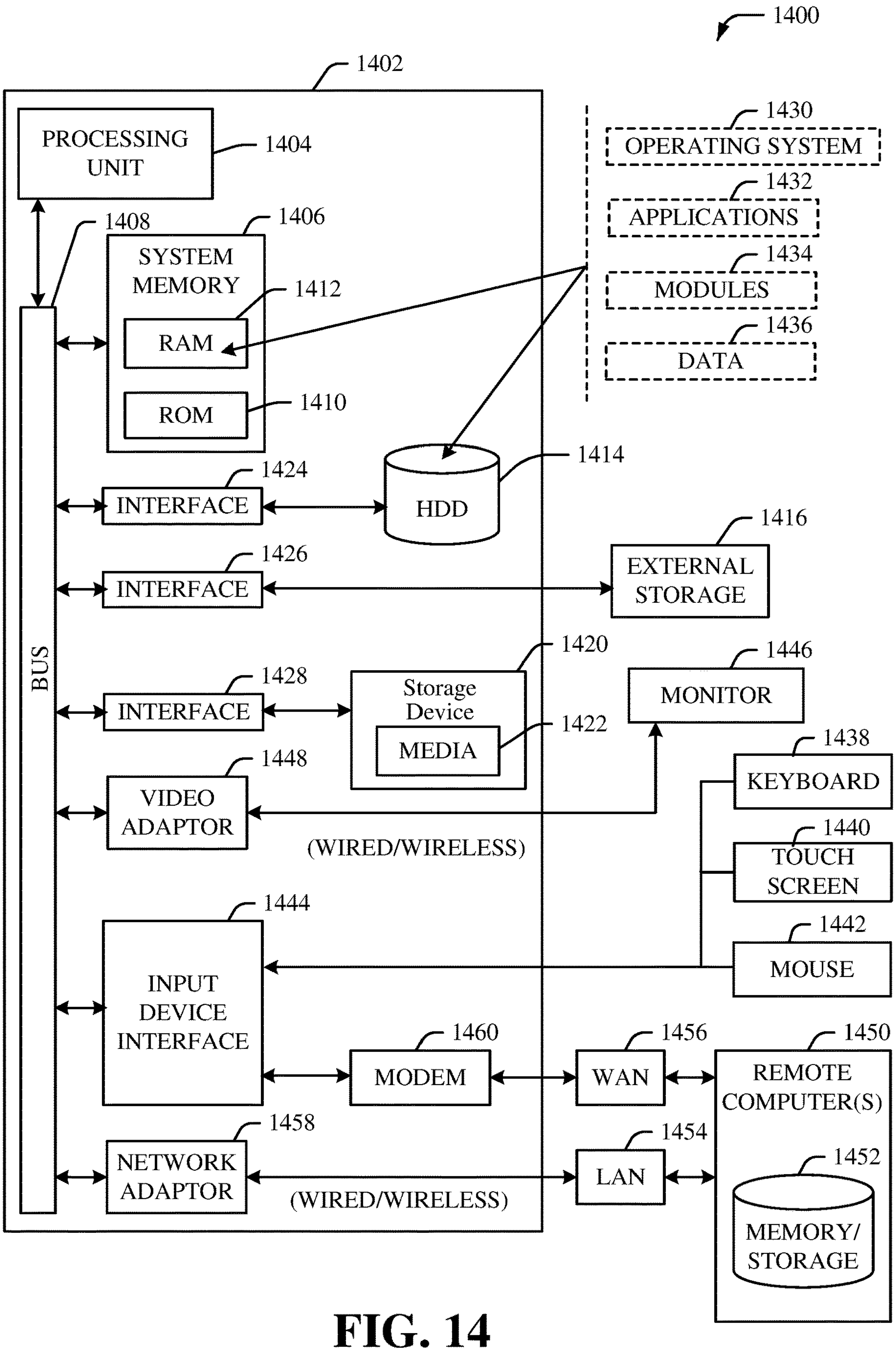
FIG. 14 depicts an example schematic block diagram of a computing environment with which the disclosed subject matter can interact/be implemented at least in part, in accordance with various embodiments and implementations of the subject disclosure.

In order to provide additional context for various embodiments described herein, FIG. 14 and the following discussion are intended to provide a brief, general description of a suitable computing environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), and can include one or more external storage devices 1416 (e.g., a magnetic floppy disk drive (FDD) 1416, a memory stick or flash drive reader, a memory card reader, etc.). While the internal HDD 1414 is illustrated as located within the computer 1402, the internal HDD 1414 can also be configured for external use in a suitable chassis (not shown). Additionally, while not shown in environment 1400, a solid state drive (SSD) could be used in addition to, or in place of, an HDD 1414.

Other internal or external storage can include at least one other storage device 1420 with storage media 1422 (e.g., a solid state storage device, a nonvolatile memory device, and/or an optical disk drive that can read or write from removable media such as a CD-ROM disc, a DVD, a BD, etc.). The external storage 1416 can be facilitated by a network virtual machine. The HDD 1414, external storage device(s) 1416 and storage device (e.g., drive) 1420 can be connected to the system bus 1408 by an HDD interface 1424, an external storage interface 1426 and a drive interface 1428, respectively.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (virtual machine) of multiple virtual machines hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1494 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are examples and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related resource or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:

at least one processor; and at least one memory that stores executable instructions that, when executed by the at least one processor, facilitate performance of operations, the operations comprising:

obtaining input/output (I/O) operation data representative of I/O operations corresponding to workload data representative of workloads maintained in a storage system;

classifying respective portions of the I/O operation data into respective workload pattern datasets;

processing the respective workload pattern datasets by respective trained models to determine respective policy recommendation data representative of respective policy recommendations with respect to storage system resources and storage system resource usage; and outputting the respective policy recommendation data, wherein a workload pattern dataset of the respective workload pattern datasets comprises random read data, wherein the determining of the respective policy recommendation data comprises predicting, by the respective trained models, read locality region data based on the random read data, and wherein the respective policy recommendation data comprises policy data corresponding to second tier usage data and avoiding using compression for the read locality region data.

2. The system of claim 1, wherein the classifying of the respective portions comprises classifying one workload pattern dataset of the respective workload pattern datasets as: random write data representative of at least one random write, random read data representative of at least one random read, sequential write data representative of at least one sequential write, or sequential read data representative of at least one sequential read.

3. The system of claim 1, wherein the classifying of the respective portions comprises classifying one workload pattern dataset of the respective workload pattern datasets as: transaction-related data related to at least one transaction, virtualization-related data related to at least one virtualization, or big data of at least a defined size.

4. The system of claim 1, wherein determining the respective policy recommendation data comprises predicting, by the respective trained models, respective storage region data representative of respective storage regions, and wherein the respective policy recommendation data is determined based on the respective storage region data.

5. The system of claim 4, wherein the predicting of the respective storage region data comprises predicting at least one of: hot storage region data representative of at least one hot storage region, cold storage region data representative of at least one cold storage region, future write storage region data representative of at least one future write storage region, future read storage region data representative of at least one future read storage region, or locality storage region data representative of at least one locality storage region.

6. The system of claim 1, wherein determining the respective policy recommendation data comprises determining at least one of: storage-related tier data representative of at least one storage-related tier, storage-related mirroring data related to storage mirroring, storage-related erasure coding data related to storage erasure coding, storage-related deduplication data related to storage deduplication, storage-related compression data related to storage compression, storage cache-related data related to at least one storage cache, storage-related read ahead region data related to at least one storage read ahead region, or processing usage data related to usage of at least one processing unit.

7. The system of claim 1, wherein determining the respective policy recommendation data comprises determining at least one of: recommended processor resources, recommended memory resources, recommended storage device resources, recommended virtual machines, or recommended docker containers.

8. The system of claim 1, wherein the respective trained models comprise at least one of: at least one clustering model, or at least one time series analysis model.

9. The system of claim 1, wherein the obtaining of the I/O operation data comprises obtaining at least one of: workload intensity data representative of at least one intensity associated with at least one workload, I/O latency data representative of at least one latency associated with at least one I/O operation of the I/O operations, processing unit usage data related to usage of at least one processing unit, or memory usage data related to usage of at least one storage unit.

10. The system of claim 1, wherein the obtaining of the I/O operation data comprises obtaining, for respective I/O operations, at least one of: respective filename data representative of respective filenames, respective volume data representative of respective volumes, respective timestamp data representative of respective timestamps, respective I/O command data representative of respective I/O commands, respective offset data representative of respective offsets, respective logical block addressing data representative of respective logical block addresses, respective length data representative of respective lengths of the I/O operations, respective pattern data representative of respective patterns associated with the I/O operations, or respective I/O latency data representative of respective I/O latencies of the I/O operations.

11. The system of claim 1, wherein the obtaining of the I/O operation data comprises using, for any of the I/O operation data exchanged between a server and a storage volume, at least one of: a dynamic tracing tool or a packet analyzer tool.

12. A method, comprising:

obtaining, by a system comprising at least one processor, collected input/output (I/O) operation data corresponding to workload data maintained in a storage system;

extracting, by the system from the collected I/O operation data, feature data;

inputting, by the system, the feature data into trained models to obtain at least one of:

storage region data, or resource usage data; and outputting recommendation data comprising policy data based on at least one of: the storage region data, or the resource usage data, wherein the feature data comprises random read data, wherein the storage region data comprises read locality region data based on the random read data, and wherein the outputting of the recommendation data comprises outputting policy data corresponding to second tier usage data and avoiding using compression for the read locality region data.

13. The method of claim 12, wherein the inputting of the feature data into the trained models comprises inputting the feature data into at least one of: a time series model, a neural network model, a clustering model, or a regression model.

14. The method of claim 12, wherein the outputting of the recommendation data comprises outputting policy data for at least one of: storage-related tier data, storage-related mirroring data, storage-related erasure coding data, storage-related deduplication data, storage-related compression data, storage cache-related data, storage-related read ahead region data, processor data, memory data, storage device data, virtual machine data, or docker container data.

15. The method of claim 12, wherein the feature data further comprises sequential write data and sequential read data, wherein the storage region data further comprises forecasted future write region data based on the sequential write data, and forecasted future read region data based on the sequential read data, wherein the inputting of the feature data into the trained models comprises inputting the feature data into time series models, and wherein the outputting of the recommendation data further comprises outputting first policy data corresponding to cache usage data and using parity-based erasure coding for the forecasted future write region data, and outputting second policy data corresponding to cache usage data and read ahead data region data for the forecasted future read region data.

16. The method of claim 12, wherein the feature data further comprises random write data, wherein the storage region data further comprises hot region data and cold region data based on the random write data, and wherein the outputting of the recommendation data further comprises outputting first policy data corresponding to first tier usage data and using data mirroring for the hot region data.

17. The method of claim 16, wherein the inputting of the feature data into the trained models comprises inputting the feature data into at least one of: a clustering model, a regression model, or a heat map model.

18. A non-transitory machine-readable medium, comprising executable instructions that, when executed by at least one processor, facilitate performance of operations, the operations comprising:

obtaining input/output (I/O) operation data corresponding to workload data maintained in a storage system;

obtaining system monitoring data corresponding to the I/O operation data;

classifying respective portions of the I/O operation data into respective I/O pattern datasets;

determining, from the system monitoring data, workload intensity data, I/O latency data, processing units usage data and memory usage data;

processing the respective I/O pattern datasets by respective first trained models to determine first respective policy recommendation data with respect to storage system resources and storage system resource usage;

processing the workload intensity data, I/O latency data, processing unit usage data and memory usage data by second trained models to determine second policy recommendation data with respect to recommending at least one of: changing memory size, changing a number of processing units, or changing storage devices; and outputting the first policy recommendation data and the second policy recommendation data, wherein an I/O pattern dataset of the respective I/O pattern datasets comprises random read data, wherein the processing of the respective I/O pattern datasets comprises determining read locality region data based on the random read data, and wherein the first policy recommendation data comprises policy data corresponding to second tier usage data and avoiding using compression for the read locality region data.

19. The non-transitory machine-readable medium of claim 18, wherein the processing of the respective I/O pattern datasets comprises inputting the respective I/O pattern datasets into at least one of: clustering models, regression models, or time series models to determine at least one of: storage region data, locality region data, or forecast region data, and wherein the first respective policy recommendation data is based on the at least one of the:

storage region data, locality region data or forecast region data.

20. The non-transitory machine-readable medium of claim 18, wherein the classifying of the respective portions comprises classifying the respective I/O pattern datasets into at least one of: random write data, random read data, sequential write data, sequential read data, transactional data, virtualization-related data, or big data.

* * * * *